(No Model.) 3 Sheets—Sheet 2.
F. LESTER.
ROTARY VALVE FOR STEAM ENGINES.
No. 526,040. Patented Sept. 18, 1894.
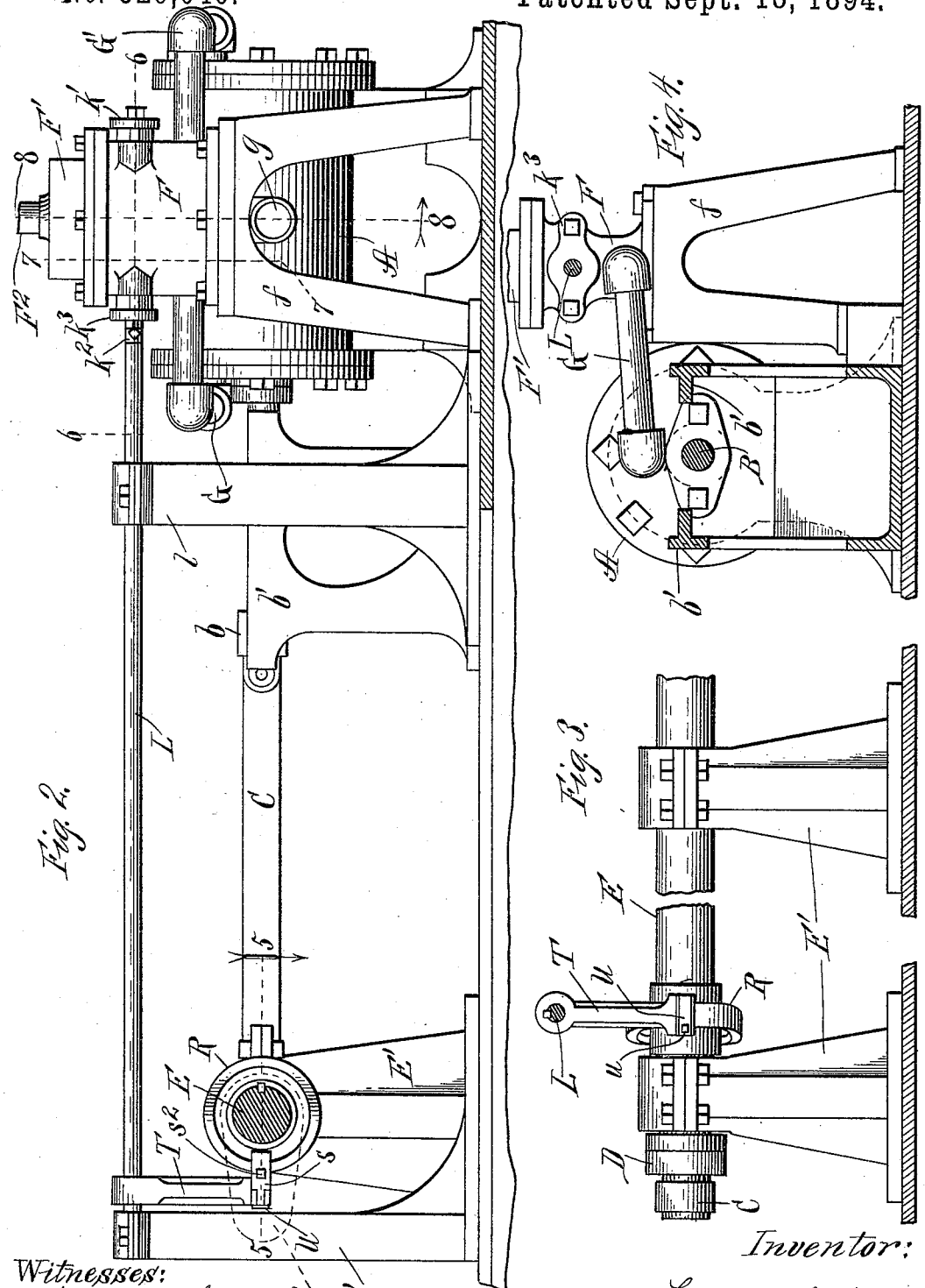
Witnesses:
W. C. Coolies
Jno. H. Christianson.
Inventor:
Frank Lester

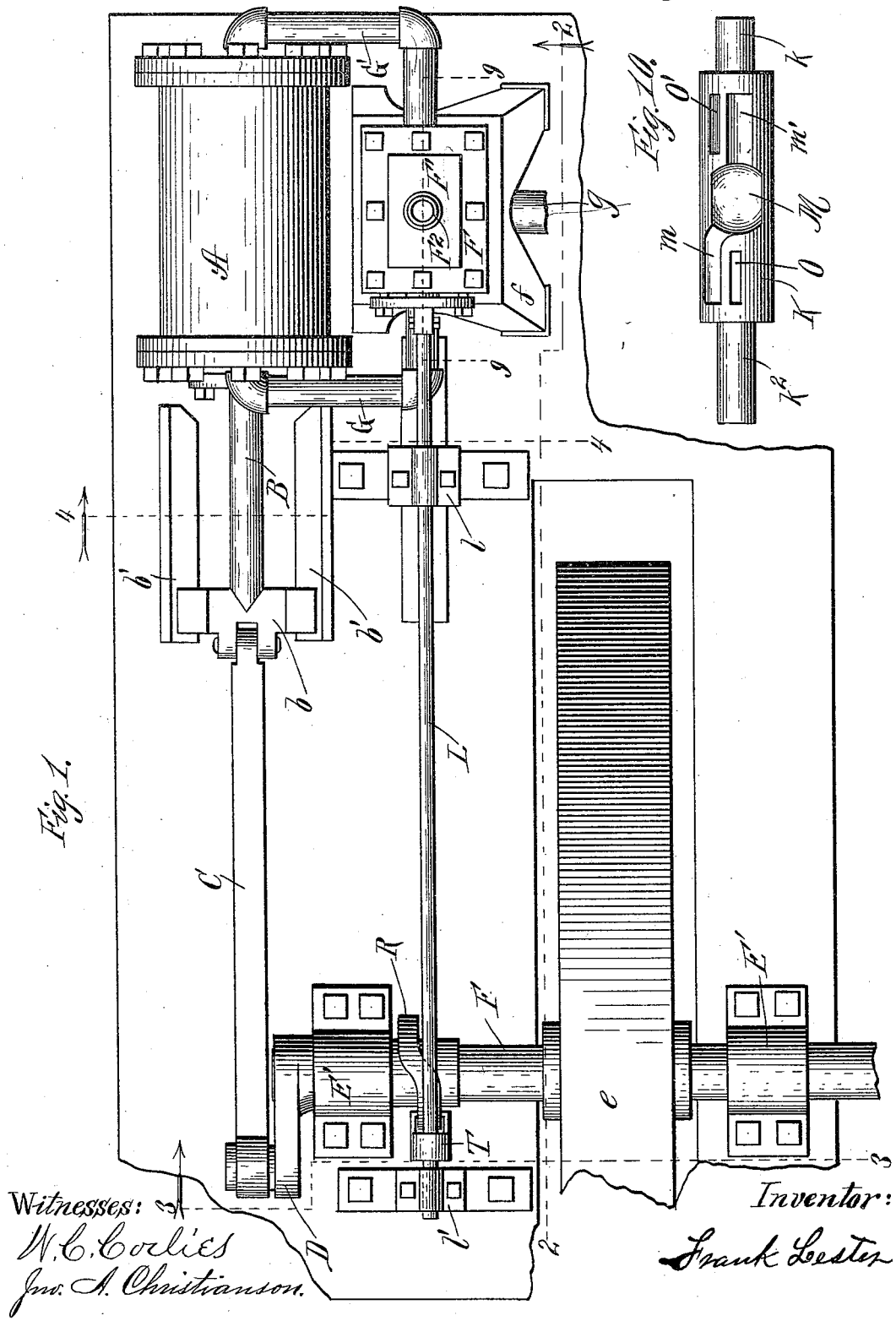

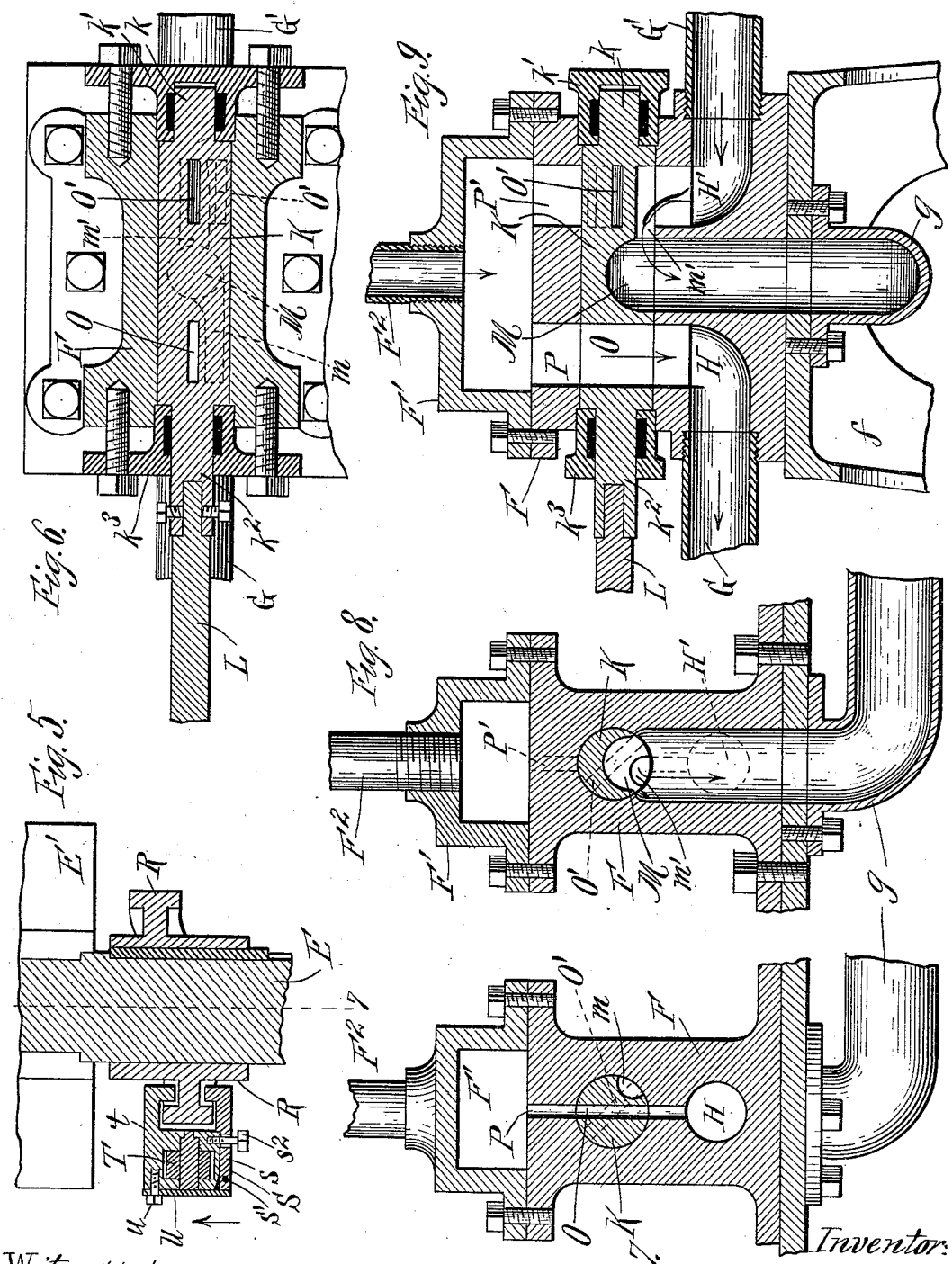

UNITED STATES PATENT OFFICE.

FRANK LESTER, OF PANHANDLE, TEXAS.

ROTARY VALVE FOR STEAM-ENGINES.

SPECIFICATION forming part of Letters Patent No. 526,040, dated September 18, 1894.

Application filed April 25, 1894. Serial No. 509,041. (No model.)

*To all whom it may concern:*

Be it known that I, FRANK LESTER, a citizen of the United States, residing at Panhandle, in the county of Carson and State of Texas, have invented certain new and useful Improvements in Rotary Valves for Steam-Engines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to stationary, reciprocating, steam engines, and its object is to simplify the valve mechanism, and the construction of the cylinder, and to reduce the steam pressure on the valve.

The invention consists in the use of a rocking valve, operating within a steam chest independent of the cylinder and connected therewith by pipes entering through the cylinder ends, a cam movement being provided for rocking the valve.

In the accompanying drawings, Figure 1, is a plan view of my improved engine. Fig. 2, is a side elevation of the same, partly in section, on the line 2—2 of Fig. 1. Fig. 3, is a cross section on the line 3—3 of Fig. 1. Fig. 4, is a detail section on the line 4—4 of Fig. 1. Fig. 5, is a detail plan section on the line 5—5 of Fig. 2. Fig. 6, is a detail plan section on the line 6—6 of Fig. 2. Fig. 7, is a detail cross section. Fig. 8, is a detail central section of the valve chest. Fig. 9, is a longitudinal vertical section on the line 9—9 of Fig. 1. Fig. 10, is a bottom plan of the valve.

The cylinder, A, is devoid of the ordinary steam chest, as formed integrally with it, and is served with steam by pipes, G, G', entering through its heads. The piston used has no special features and I have not deemed it necessary to show it. The piston rod is shown at B, its outer end being supported by a cross-head, $b$, sliding upon the guide bars, $b'$, in the usual manner. The connecting rod, or pitman, C, communicates power from the piston rod, B, to an ordinary crank, D, carried by a shaft, E, journalled in the standards, E', and carrying the fly-wheel, $e$.

The valve chest, F, is mounted upon a standard, $f$, and a steam chest, F', is superimposed upon it. The steam service pipe leading from the boiler (not shown) to the steam chest is shown at $F^2$, and the exhaust pipe at $g$. The pipes G, G', enter the valve chest upon opposite sides leading respectively from the ports, H, H', opening through the valve seat.

The valve, K, is cylindrical in form having trunnions $k, k^2$, at either end which are journaled in blocks, $k', k^3$, adjustably attached to the valve chest and being suitably packed against leakage. Oblong ports, P, P', lead upwardly from the valve seat to the chamber of the steam chest, F'. The port of the exhaust pipe, $g$, is located between the ports H, H'. The valve, K, is provided with an exhaust cavity, M, which is adapted to be at all times open to the exhaust pipe, $g$, and the face of the valve is grooved, or channeled, longitudinally in both directions from the cavity, M, as shown at $m, m'$, these two channels being out of alignment. Two ducts, O, O', lead diametrically through the body of the valve opening respectively, adjacent to, but not through the channels, $m$, $m'$, and being in alignment, respectively, with the channels $m', m$. The ports H, and H', are in alignment and are directly opposite, respectively, the ports, P, P', so that when the valve is in the position shown in Figs. 6, 7 and 9, the steam is lead from the steam chest F', to the pipe, G, and the channel, $m'$, opens the pipe, G', to the exhaust port. The turning of the valve cuts off the steam from the pipe, G, and brings that pipe into communication with the exhaust, and the duct, O', registers with the ports, P', H', leading the steam to the pipe, G'. This shifting of the valve, K, is accomplished by means of a cam, R, mounted upon the shaft, E, and co-operating with the valve stem, L, which is a rock shaft journaled in the floor hangers, $l, l'$, and rigidly attached to the trunnion $k^2$. The cam, R, is in wheel form. Its rim has two lateral off-sets in opposite directions and diametrically opposite, the intervening portions being straight. The shaft, L, is above the cam. An arm, T, is rigidly fixed to the shaft and hangs before the face of the cam. This arm, T, carries a shifter, S, which engages and slides upon the rim of the cam, whereby a swinging motion is communicated to the arm, and the shaft, L, is rocked. The oscillation of the shaft, L, by the action of the cam is so timed as to coincide with the dead points of the piston action, and the porting of the valve, K, and its chest is arranged to properly time the ingress and egress of the steam.

The shifter, S, comprises two members, a block, t, bolted to the arm, T, and having an arm adapted to bear against one edge of the rim of the cam, R, and preferably having a hooked end so as to project under the rim; and an arm, s, pivotally attached to the block, t, at s', and adapted to bear against the other edge of the cam rim,—its end also being hooked so as to project within the rim. The arm s, is so pivoted upon the block, t, as to swing away from the edge of the cam and prevent binding as the shifter, S, passes the shoulders of the cam. The arm, s, is apertured to loosely accommodate a stud, $s^2$, set through this aperture into the block, t, for the purpose of preventing lateral movement of the arms, s. A spring, U, is attached to the block, t, as shown at u, so as to bear against the arm, s, and hold it to the rim of the cam.

By the construction of the engine substantially as described the cylinder casting is simplified to a mere tube having radiating flanges at its ends for the attachment of the heads, and the steam valve chests are simplified. The area of pressure upon the valve is reduced to that of one of the ports, P, P', and as a consequence the valve movement is very easy, thereby requiring but little power and lessening the wear due to friction.

I do not desire to be limited to the details of construction shown and described as the form of the cam, and the shifter may be varied indefinitely. So also may the arrangement of the parts of the valve and its chest be changed so as to differently time the ingress and egress of the steam without departing from the scope of the invention.

I claim as my invention—

1. The combination, with a rocking valve having diametrical lead ducts at differing angular positions, an exhaust cavity between the ducts, and channels leading from such cavity longitudinally in opposite directions, such channels being out of alignment with each other but each being in alignment with the duct upon the opposite side of the cavity, of a valve chest for inclosing the valve and having ducts, P, P', in longitudinal alignment leading to the valve seat and ducts, H, H', leading from the valve seat and being opposite the ducts P, P', and an exhaust port between the ducts H, H', substantially as described and for the purpose set forth.

2. In a steam engine the combination with the cylinder, of a steam chest, a rocking valve having diametrical lead ducts at differing angular positions, an exhaust cavity between the ducts and channels leading from such cavity longitudinally in each direction, such channels being out of alignment with each other but each being in alignment with the duct upon the opposite side of the cavity, a valve chest for inclosing the valve and having ports, P, P', in alignment as to the axis of the valve, leading from the valve seat to the steam chest, and ports, H, H', opposite the ports, P, P', and leading outwardly from the valve seat and having an exhaust port located between the ports, H, H', pipes leading from the ports, H, H', to the cylinder, and means for rocking the valve, substantially as described and for the purpose specified.

3. In a steam engine the combination with the cylinder, and with the crank shaft, of a steam chest, a rocking valve having diametrical lead ducts at differing angular positions, an exhaust cavity between the ducts and channels leading from such cavity longitudinally in each direction, such channels being out of alignment with each other but each being in alignment with the duct upon the opposite side of the cavity, a valve chest for inclosing the valve and having ports, P, P', in alignment as to the axis of the valve leading from the valve seat to the steam chest and ports, H, H', opposite the ports, P, P', and leading outwardly from the valve seat, and having an exhaust port located between the ports, H, H', pipes leading from the ports, H, H', to the cylinder, a rock shaft fixed to the valve, a cam mounted upon the crank shaft for shifting the valve at the end of each piston stroke, and a shifter attached to the rock shaft and riding upon the cam, substantially as described and for the purpose specified.

In testimony whereof I affix my signature in presence of two witnesses.

FRANK LESTER.

Witnesses:
B. M. BAKER,
DAN A. LEARY.